US012588020B2

(12) United States Patent
Lin et al.

(10) Patent No.: US 12,588,020 B2
(45) Date of Patent: Mar. 24, 2026

(54) METHOD AND USER EQUIPMENT FOR MULTI-TRANSMISSION/RECEPTION POINT OPERATIONS

(71) Applicant: SHARP KABUSHIKI KAISHA, Sakai (JP)

(72) Inventors: Chia-Hung Lin, Taipei (TW); Chia-Hao Yu, Taipei (TW); Hsin-Hsi Tsai, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 667 days.

(21) Appl. No.: 17/922,447

(22) PCT Filed: May 7, 2021

(86) PCT No.: PCT/CN2021/092178
§ 371 (c)(1),
(2) Date: Oct. 31, 2022

(87) PCT Pub. No.: WO2021/227958
PCT Pub. Date: Nov. 18, 2021

(65) Prior Publication Data
US 2023/0171766 A1     Jun. 1, 2023

Related U.S. Application Data

(60) Provisional application No. 63/023,205, filed on May 11, 2020.

(51) Int. Cl.
*H04W 72/1268*       (2023.01)
*H04B 7/06*          (2006.01)
(Continued)

(52) U.S. Cl.
CPC ...... *H04W 72/1268* (2013.01); *H04B 7/0639* (2013.01); *H04L 1/08* (2013.01); *H04W 72/23* (2023.01)

(58) Field of Classification Search
CPC  H04W 72/1268; H04W 72/23; H04B 7/0639; H04L 1/08
See application file for complete search history.

(56) References Cited

U.S. PATENT DOCUMENTS

| | | | |
|---|---|---|---|
| 12,418,335 B2 * | 9/2025 | Kang | H04W 72/0446 |
| 2019/0174466 A1 * | 6/2019 | Zhang | H04L 5/0057 |

(Continued)

FOREIGN PATENT DOCUMENTS

| | | |
|---|---|---|
| CN | 110535614 A | 12/2019 |
| CN | 110536450 A | 12/2019 |

(Continued)

OTHER PUBLICATIONS

ZTE, "Further details on multi-beam/TRP operation", 3GPP TSG RAN WG1 #98, R1-1908194, Aug. 30, 2019.

(Continued)

*Primary Examiner* — Jael M Ulysse
(74) *Attorney, Agent, or Firm* — ScienBiziP, P.C.

(57) ABSTRACT

A method performed by a UE for communicating with a plurality of TRPs is provided. The method includes: receiving, from the BS, one or more RRC messages that configure the UE with a first SRS resource set associated with a first TRP, a second SRS resource set associated with a second TRP, and a cyclical mapping pattern for a plurality of PUSCH repetitions, a usage of the first SRS resource set and the second SRS resource set being configured for codebook-based transmissions; and transmitting the plurality of PUSCH repetitions based on the cyclical mapping pattern at least by: transmitting a first PUSCH repetition of the plurality of PUSCH repetitions to the first TRP according to the first SRS resource set; and transmitting a second PUSCH repletion of the plurality of PUSCH repetitions to the second (Continued)

TRP according to the second SRS resource set after transmitting the first PUSCH repetition.

16 Claims, 8 Drawing Sheets

(51) Int. Cl.
  H04L 1/08      (2006.01)
  H04W 72/23    (2023.01)

(56)              References Cited

U.S. PATENT DOCUMENTS

| | | | |
|---|---|---|---|
| 2020/0106559 A1 | 4/2020 | Vilaipornsawai et al. | |
| 2020/0367208 A1* | 11/2020 | Khoshnevisan | H04W 72/23 |
| 2021/0037478 A1* | 2/2021 | Yang | H04W 52/247 |
| 2021/0044385 A1* | 2/2021 | Hosseini | H04L 1/1887 |
| 2021/0167830 A1 | 6/2021 | Song et al. | |
| 2021/0219246 A1* | 7/2021 | Xu | H04W 52/146 |
| 2021/0226680 A1* | 7/2021 | Khoshnevisan | H04B 7/0404 |
| 2022/0330258 A1 | 10/2022 | Xiao et al. | |
| 2023/0061346 A1* | 3/2023 | Park | H04W 72/563 |
| 2023/0076139 A1* | 3/2023 | Muruganathan | H04W 16/28 |
| 2023/0078723 A1* | 3/2023 | Kim | H04W 74/0816 |
| | | | 370/329 |
| 2023/0098912 A1* | 3/2023 | Matsumura | H04W 72/21 |
| | | | 370/329 |
| 2023/0124582 A1* | 4/2023 | Frenne | H04W 72/23 |
| | | | 370/329 |
| 2023/0171763 A1* | 6/2023 | Gao | H04W 52/08 |
| | | | 370/329 |
| 2023/0397125 A1* | 12/2023 | Xu | H04W 52/42 |
| 2024/0032063 A1* | 1/2024 | Grossmann | H04L 5/0051 |
| 2024/0032088 A1* | 1/2024 | Park | H04L 1/08 |
| 2024/0224278 A1* | 7/2024 | Miao | H04L 1/08 |

FOREIGN PATENT DOCUMENTS

| | | |
|---|---|---|
| CN | 110831196 A | 2/2020 |
| EP | 4016910 A1 | 6/2022 |
| JP | 2019118035 A | 7/2019 |
| WO | 2020044409 A1 | 3/2020 |
| WO | 2020073289 A1 | 4/2020 |

OTHER PUBLICATIONS

LG Electronics: "Feature lead summary of Enhancements on Multi-beam Operations", 3GPP Draft; R1-1907650, 3GPP TSG RAN WG1 Meeting #97, Reno, USA, May 13-17, 2019 (May 16, 2019).

Intel Corporation: "Discussion on multi-beam enhancements", R1-1908654, 3GPP TSG RAN WG1 #98, Prague, CZ, Aug. 26-30, 2019.

NTT Docomo, Inc., "Layer 1 enhancements for NR URLLC", R1-1811378, 3GPP TSG RAN WG1 Meeting #94bis, Chengdu, China, Oct. 8-12, 2018.

* cited by examiner

502

700

Receive UL DCI from a BS, the UL DCI including a first TPMI associated with the first TRP and a second TPMI associated with the second TRP          702

Transmit a first PUSCH repetition to the first TRP according to the first TPMI          704

Transmit a second PUSCH repetition to the second TRP according to the second TPMI          706

METHOD AND USER EQUIPMENT FOR MULTI-TRANSMISSION/RECEPTION POINT OPERATIONS

CROSS-REFERENCE TO RELATED APPLICATION(S)

The present disclosure is the National Stage of International Patent Application Serial No. PCT/CN2021/092178, filed on May 7, 2021, which claims the benefit of and priority to U.S. Provisional Patent Application Ser. No. 63/023,205, filed on May 11, 2020. The contents of each of the above-mentioned applications are hereby fully incorporated herein by reference for all purposes.

FIELD

The present disclosure generally relates to wireless communication, and more particularly, to a method and a User Equipment (UE) for multi-Transmission Reception Point (TRP) operations.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a UE for multi-TRP operations.

According to a first aspect of the present disclosure, a method performed by a UE for communicating with a plurality of TRPs including a first TRP and a second TRP is provided. The method includes receiving Uplink (UL) Downlink Control Information (DCI) from a Base Station (BS), the UL DCI comprising a first Transmit Precoder Matrix Indication (TPMI) associated with the first TRP and a second TPMI associated with the second TRP; transmitting a first Physical Uplink Shared Channel (PUSCH) repetition to the first TRP according to the first TPMI; and transmitting a second PUSCH repetition to the second TRP according to the second TPMI.

According to a second aspect of the present disclosure, a UE for communicating with a plurality of TRPs including a first TRP and a second TRP is provided. The UE includes at least one processor, a receiver coupled to the at least one processor, and a transmitter coupled to the at least one processor. The receiver is configured to receive UL DCI from a BS, the UL DCI comprising a first TPMI associated with the first TRP and a second TPMI associated with the second TRP. The transmitter is configured to transmit a first PUSCH repetition to the first TRP according to the first TPMI and transmit a second PUSCH repetition to the second TRP according to the second TPMI.

According to a third aspect of the present disclosure, a method performed by a User Equipment (UE) for communicating with a plurality of Transmission Reception Points (TRPs) including a first TRP and a second TRP associated with a Base Station (BS) is provided. The method includes: receiving, from the BS, one or more Radio Resource Control (RRC) messages that configure the UE with a first Sounding Reference Signal (SRS) resource set associated with the first TRP, a second SRS resource set associated with the second TRP, and a cyclical mapping pattern for a plurality of Physical Uplink Shared Channel (PUSCH) repetitions, the first SRS resource set and the second SRS resource set being configured for codebook-based transmissions; and transmitting the plurality of PUSCH repetitions based on the cyclical mapping pattern at least by: transmitting a first PUSCH repetition of the plurality of PUSCH repetitions to the first TRP according to the first SRS resource set and the cyclical mapping pattern; and transmitting a second PUSCH repletion of the plurality of PUSCH repetitions to the second TRP according to the second SRS resource set and the cyclical mapping pattern after transmitting the first PUSCH repetition.

In some implementations of the third aspect of the present disclosure, the one or more RRC messages include a first Transmit Precoder Matrix Indication (TPMI) associated with the first SRS resource set and a second TPMI associated with the second SRS resource set.

In some implementations of the third aspect of the present disclosure, the cyclical mapping pattern determines a mapping relationship among the first TPMI, the second TPMI, and the plurality of PUSCH repetitions.

In some implementations of the third aspect of the present disclosure, the one or more RRC messages further include a first SRS Resource Indicator (SRI) corresponding to the first SRS resource set and a second SRI corresponding to the second SRS resource set.

In some implementations of the third aspect of the present disclosure, the method further includes: receiving Uplink (UL) Downlink Control Information (DCI) from the BS, the UL DCI including a first Transmit Precoder Matrix Indication (TPMI) associated with the first SRS source set and a second TPMI associated with the second SRS resource set.

In some implementations of the third aspect of the present disclosure, the cyclical mapping pattern determines a mapping relationship among the first TPMI, the second TPMI, and the plurality of PUSCH repetitions.

In some implementations of the third aspect of the present disclosure, the second TPMI applies a same number of layers indicated by the first TPMI for the codebook-based transmissions.

In some implementations of the third aspect of the present disclosure, the UL DCI further includes a first SRS Resource Indicator (SRI) corresponding to the first SRS resource set and a second SRI corresponding to the second SRS resource set.

According to a fourth aspect of the present disclosure, a User Equipment (UE) for communicating with a plurality of Transmission Reception Points (TRPs) including a first TRP and a second TRP associated with a Base Station (BS) is provided. The UE includes transceiver circuitry and at least one processor. The at least one processor is coupled to the transceiver circuitry and configured to control the transceiver circuitry to: receive, from the BS, one or more Radio Resource Control (RRC) messages that configure the UE with a first Sounding Reference Signal (SRS) resource set associated with the first TRP, a second SRS resource set associated with the second TRP, and a cyclical mapping pattern for a plurality of Physical Uplink Shared Channel (PUSCH) repetitions, the first SRS resource set and the second SRS resource set being configured for codebook-based transmissions; and transmit the plurality of PUSCH repetitions based on the cyclical mapping pattern at least by: transmitting a first PUSCH repetition of the plurality of PUSCH repetitions to the first TRP according to the first SRS resource set and the cyclical mapping pattern; and transmitting a second PUSCH repletion of the plurality of PUSCH repetitions to the second TRP according to the second SRS resource set and the cyclical mapping pattern after transmitting the first PUSCH repetition.

In some implementations of the fourth aspect of the present disclosure, the one or more RRC messages include a first Transmit Precoder Matrix Indication (TPMI) associated with the first SRS resource set and a second TPMI associated with the second SRS resource set.

In some implementations of the fourth aspect of the present disclosure, the cyclical mapping pattern determines a mapping relationship among the first TPMI, the second TPMI, and the plurality of PUSCH repetitions.

In some implementations of the fourth aspect of the present disclosure, the one or more RRC messages further include a first SRS Resource Indicator (SRI) corresponding to the first SRS resource set and a second SRI corresponding to the second SRS resource set.

In some implementations of the fourth aspect of the present disclosure, the at least one processor is further configured to control the transceiver circuitry to: receive Uplink (UL) Downlink Control Information (DCI) from the BS, the UL DCI including a first Transmit Precoder Matrix Indication (TPMI) associated with the first SRS source set and a second TPMI associated with the second SRS resource set.

In some implementations of the fourth aspect of the present disclosure, the cyclical mapping pattern determines a mapping relationship among the first TPMI, the second TPMI, and the plurality of PUSCH repetitions.

In some implementations of the fourth aspect of the present disclosure, the second TPMI applies a same number of layers indicated by the first TPMI for the codebook-based transmissions.

In some implementations of the fourth aspect of the present disclosure, the UL DCI further includes a first SRS Resource Indicator (SRI) corresponding to the first SRS resource set and a second SRI corresponding to the second SRS resource set.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
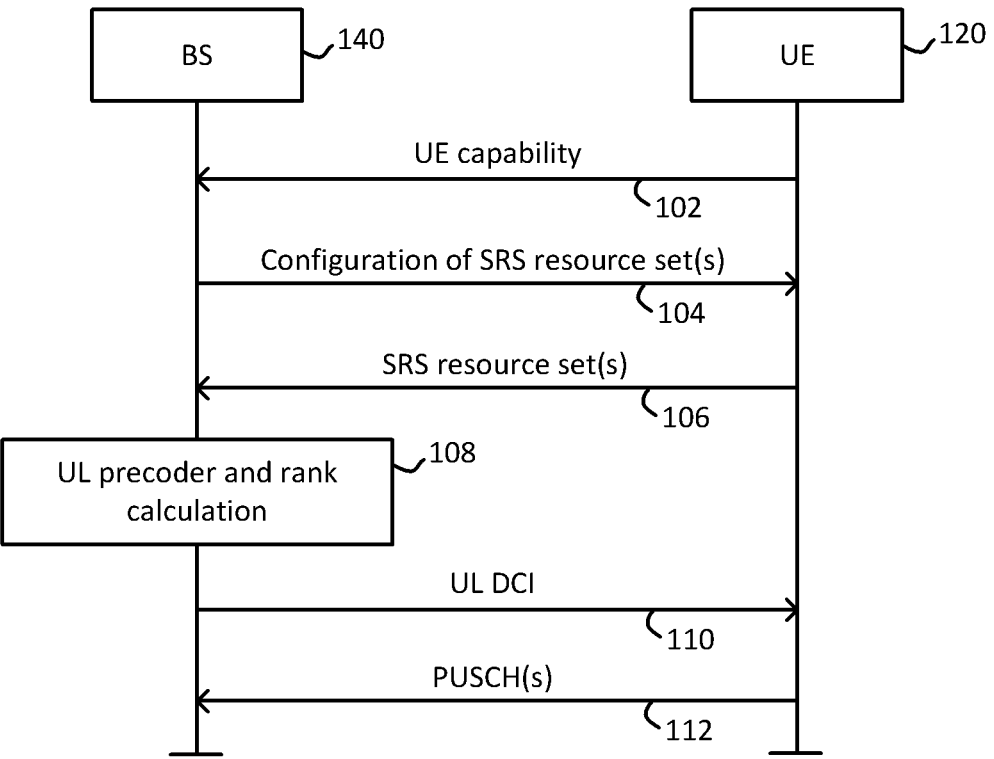
FIG. 1 is a diagram illustrating a procedure for a Code-Book (CB)-based UL transmission according to an implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Applications Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (5CG) may be called a Special Cell (SpCell). A Primary Cell (PCell) may refer to the SpCell of an MCG. A Primary 5CG Cell (PSCell) may refer to the SpCell of an 5CG. An MCG may refer to a group of serving cells associated with the Master Node (MN), comprising the SpCell and optionally one or more SCells. An 5CG may refer to a group of serving cells associated with the Secondary Node (SN), comprising the SpCell and optionally one or more SCells.

As disclosed previously, the frame structure for NR supports flexible configurations for accommodating various next-generation (e.g., 5G) communication requirements such as eMBB, mMTC, and URLLC, while fulfilling high reliability, high data rate and low latency requirements. The Orthogonal Frequency-Division Multiplexing (OFDM) technology in 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

In Release 16 (Rel-16) NR, the mechanism of Physical Downlink Shared Channel (PDSCH) repetition may be used in multi-TRP scenarios for particular service(s), such as URLLC. With the introduction of the mechanism of PDSCH repetition, a PDSCH may be repeatedly transmitted one or more times, so that the reliability of a PDSCH transmission is enhanced.

In addition to the abovementioned PDSCH enhancement in multi-TRP scenarios, the enhancement of transmissions of other types of physical channels (e.g., Physical Uplink Shared Channel (PUSCH), Physical Downlink Control Channel (PDCCH) or Physical Uplink Control Channel (PUCCH)) in multi-TRP scenarios still requires further clarification.

There are two types of supported PUSCH transmissions in NR, namely CodeBook (CB) based transmission and non-codebook (non-CB) based transmission. CB-based UL transmission has been used in commercial communication systems such as W-CDMA, LIE, and NR. The operation of a CB-based UL transmission may depend on network (NW) indications (e.g., transmit parameter(s) including Transmit Rank Indication (TRI), Transmit Precoder Matrix Indication (TPMI), Sounding Reference Signal (SRS) resource indication (SRI), Modulation Coding Scheme (MCS), and/or Transmit Power Control (TPC)). A TRI and a TPMI may be common signaling content and associated with an SRS resource set that includes at least one SRS resource used for channel sounding at the NW side. In NR, a UE may be configured with multiple SRS resource sets. At least one of the configured SRS resource sets may be indicated by the NW via an SRI. The value of the NW indication described previously may be determined by the network based on channel conditions with respect to a UE. In the present disclosure, a TPMI may be referred to as a Precoder Matrix Indication (PMI). The terms "TPMI" and "PMI" are not uniformly named in the industry currently and are collectively referred to as "TPMI" in the present disclosure.

FIG. 1 is a diagram illustrating a procedure for a CB-based UL transmission according to an implementation of the present disclosure. As illustrated in FIG. 1, in action 102, a UE 120 may report a UE capability message to a BS 140 (e.g., gNB). In action 104, the BS 140 may configure the UE with one or multiple SRS resource sets (e.g., via RRC signaling). In action 106, the UE 120 may transmit the configured SRS resource(s) to the BS 140 for UL channel estimation. In action 108, the BS 140 may calculate a precoder and rank based on the SRS resource(s) received from the UE 120. In action 110, the BS 140 may provide one or more transmit parameters (e.g., TRI, TMPI and/or SRI) to the UE 120 via scheduling DCI (or "UL DCI"). In action 112, the UE 120 may perform PUSCH transmission(s) based on the transmit parameter(s) provided in the scheduling DCI.

According to some implementations of the present disclosure, PUSCH enhancement in NR may be achieved by introducing repetition mechanisms in PUSCH transmissions to increase transmission reliability, with different PUSCH repetitions targeting different TRPs. If the repetition mechanisms are applied, the NW may include some transmit parameters (e.g., TPMI, MCS, and/or TPC) in the scheduling DCI to inform the UE how to perform the PUSCH repetitions. In the present disclosure, a "PUSCH repetition" may refer to one of one or more repeated PUSCH transmissions performed by a UE.

For a CB-based PUSCH transmission, a TPMI and a UL beam associated with the TMPI, which are indicated by the scheduling DCI, may be applied to a PUSCH transmission. In a multi-TRP scenario, different TRPs may be located at different geographic positions. Therefore, the transmit parameters for PUSCH transmissions toward different TRPs may be different due to different channel conditions. Details on how to inform a UE of multiple sets of transmit parameters for repetitive TRPs/PUSCH transmissions may require clarification.

On the other hand, larger channel attenuation is expected for higher frequency bands, such as those in Frequency Range 2 (FR2). To compensate for the additional channel loss in high frequency bands, beamforming technology may be applied. A UE with beamforming capability is usually equipped with multiple antenna panels. With each antenna panel providing spatial coverage potential in a different direction, multiple antenna panels contribute to an aggregated spatial coverage in an isotropic/omni-directional manner. As a result, selecting applicable antenna panels for PUSCH repetitions is another issue for PUSCH enhancement in multi-TRP scenarios. On an antenna panel (or simply referred to as "panel"), one or more antenna elements may be placed in a particular way to form an antenna array. Each antenna panel may be used as a basic unit for beamforming. Therefore, beam indication may need to be jointly considered with panel selection/indication.

As described previously, for a CB-based PUSCH transmission, a UE may report its capability (e.g., support of full-coherence, partial-coherence, or non-coherence among individual antenna ports) to the BS.

The BS may determine a search range of the precoder according to the UE's capability to reduce calculation complexity. The BS may then configure SRS resource set(s) to the UE for channel training purposes. According to Release 15 (Rel-15)/Rel-16, an SRS resource set associated with a CB-based PUSCH transmission may include up to two SRS resources, where each of the SRS resources may be associated with different panels. After a UE transmits the SRS resource(s) in the SRS resource set to the BS, the BS may perform channel estimation for selecting a proper precoder, rank, and associated SRS resource. The precoder, rank, and SRS resource selected by the BS may be then provided to the UE via DCI for scheduling a PUSCH transmission. The SRS resource selection may be accompanied with panel selection since each SRS resource in the SRS source set may be transmitted via a beam that is associated with a particular panel. In this sense, an SRI provided in the scheduling DCI may be considered as a panel indication.

Figure 2:
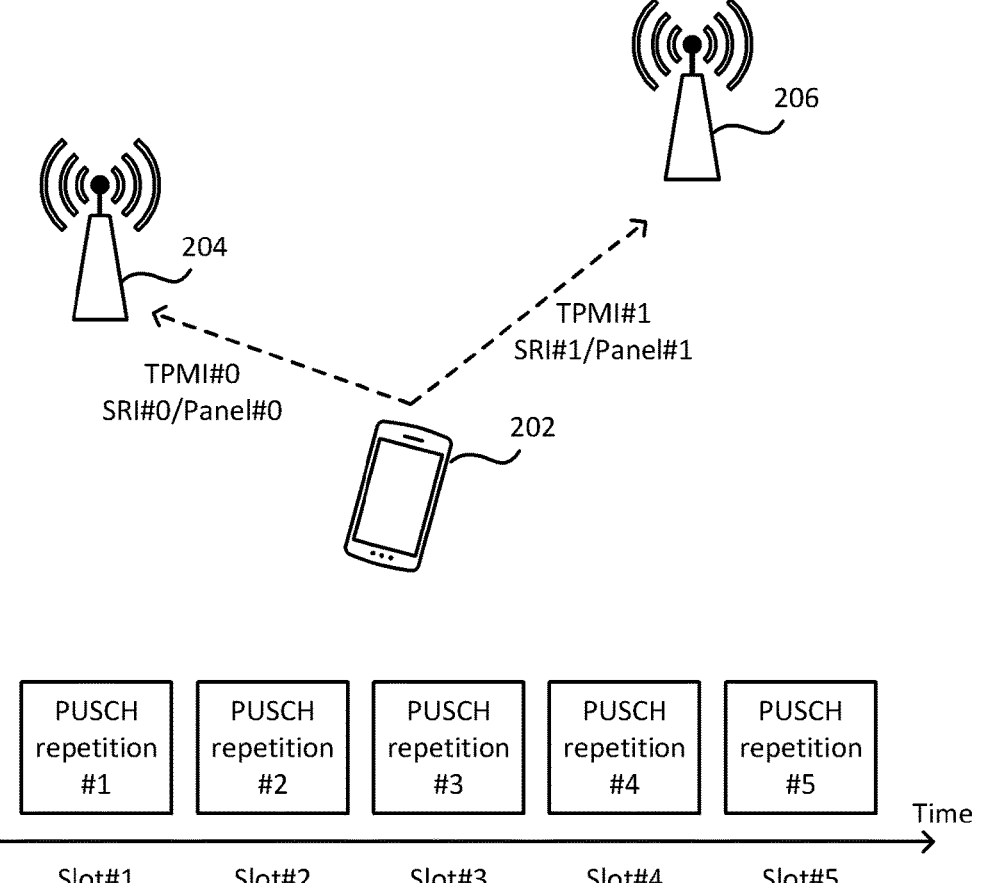
FIG. 2 is a schematic diagram illustrating a multi-TRP operation based on CB-based PUSCH repetitions according to an implementation of the present disclosure.

FIG. 2 is a schematic diagram illustrating a multi-TRP operation based on CB-based PUSCH repetitions according to an implementation of the present disclosure. As illustrated in FIG. 2, a UE 202 is in a multi-TRP scenario where two TRPs 204 and 206 are communicating with the UE 202.

The UE 202 may be equipped with certain capabilities (e.g., fast panel switching) to carry out the NW instruction(s) carried in the DCI signaling if the UE 202 supports using the different TPMIs for different PUSCH repetitions. For example, the UE 202 may use panel #0/SRI #0 and TPMI #0 to perform PUSCH repetitions #0, #2 and #4, and use panel #1/SRI #1 and TPMI #1 to perform PUSCH repetitions #1, #3 and #5. In such a case, panel switching may be performed in each time slot (e.g., slot #0, #1, #2, #3, #4 or #5).

The UE 202 may explicitly or implicitly inform the network whether the UE 202 supports fast panel switching (e.g., via a UE capability message), and/or whether the UE 202 supports performing PUSCH repetitions with different TPMI/panel indications for different TRPs. For example, in the case of the UE supporting performing multi-panel transmission, the network may know that the UE may also support performing PUSCH repetitions with different TPMI/panel indications for different TRPs. Fast panel switching may refer to a process of switching the antenna panel from one to another for reception/transmission in a relatively short time period (e.g., a slot or a time period with its length shorter than a slot).

A UE may select an applicable panel (e.g., the panel providing the largest channel gain) to transmit PUSCH (repetitions) to different TRPs. During the training phase, different SRS resources may be transmitted via different UL beams associated with different panels. According to some implementations of the present disclosure, the size of an SRS resource set may be extended (which is referred to "SRS resource extension" in the present disclosure). For example, the maximum number of SRS resources in an SRS resource set may be more than two. If SRS resources extension is applied, the information needed for UL transmission (e.g., PUSCH transmission) may be provided in a UL Transmission Configuration Indication (TCI) field and/ or an SRI in DCI. For example, such information may include power related information, beam related information (e.g., beam indications), precoders (e.g., TPMIs), SRS resource index(es) used the derivation of the essential information, and/or panel indications.

According to some implementations of the present disclosure, a single piece of DCI (i.e., a single DCI message) may include multiple TPMIs and multiple SRIs/panel indications, where each TPMI may identify a precoder to be applied to a UL transmission, and each SRI (or panel indication) may identify a panel to perform the UL transmission. In one implementation, the (single piece of) DCI may have a UL DCI format that includes at least two TPMI fields and at least two SRI fields (or panel indication fields), where each TPMI field may contain a TPMI, and each SRI field (or panel indication field) may contain an SRI (or panel indication). As described previously, an SRI field (or SRI) may be used to implicitly indicate a panel that is suitable to be used for PUSCH transmission. In one implementation, the bit length of a TPMI and/or an SRI (or panel indication) may be increased, depending on the number of TRPs, and/or the number of panels on the UE. For example, the bit length of a TPMI and/or an SRI (or panel indication) may depend on the number of active panels on the UE. In one implementation, a table that describes the correspondence relationship between the value(s) indicated by the TPMI/SRI/ panel indication field(s) and the corresponding precoder(s)/ beam(s)/panel(s) may be provided.

If carrying multiple TPMIs and SRIs (or panel indications) in a single piece of DCI is not supported, a UE may obtain, from RRC signaling, information on whether the TPMI and SRI (or panel indication) associated with each PUSCH repetition remains the same. If the UE obtains, from (dedicated) RRC signaling, information indicating that the TPMI and SRI (or panel indication) for each PUSCH repetition remains the same, the UE may expect that the DCI format it monitors for a PUSCH transmission in multi-TRP operations carries only one TPMI and/or only one SRI (or panel indication), e.g., only one TPMI, SRI (or panel indication) field, only one UL TCI in the DCI format associating with or providing information on TPMI, SRI (or panel indication), and so on, but not limited to. In one implementation, the network may inform a UE of the number of pieces of DCI the UE should receive for PUSCH repetitions (i.e., the number of DCI messages the UE should receive for PUSCH repetitions) in multi-TRP operations.

The PUSCH repetitions triggered by the same UL DCI may be mapped to different beams, panels, or Redundancy Version (RV)s. The rule of mapping the RVs, beams, and/or panels to the PUSCH repetitions may be predetermined.

Figure 3:
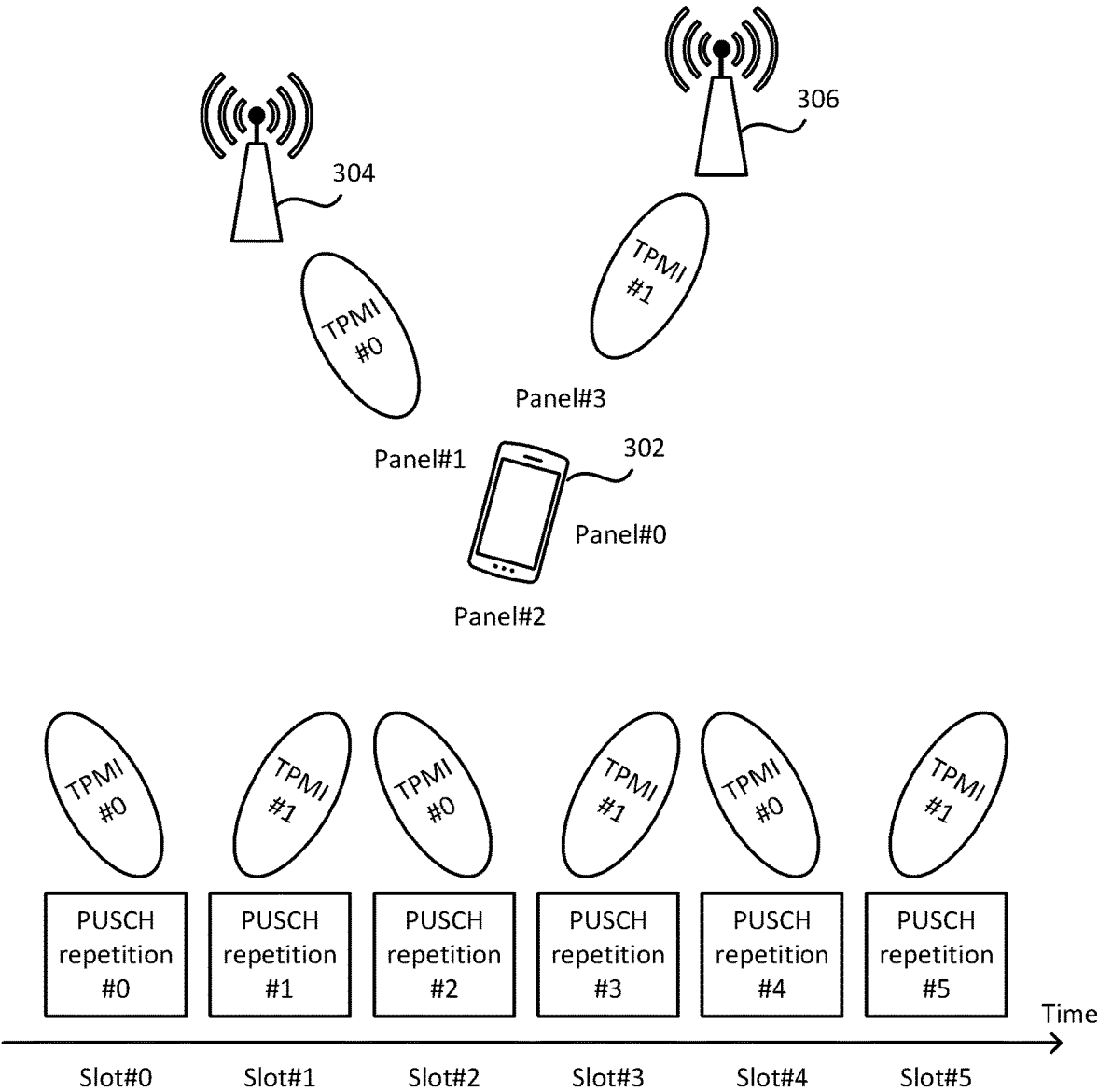
FIG. 3 is a schematic diagram illustrating multiple PUSCH repetitions mapped to different TPMIs according to an implementation of the present disclosure.

FIG. 3 is a schematic diagram illustrating multiple PUSCH repetitions mapped to different TPMIs according to an implementation of the present disclosure. As illustrated in FIG. 3, the mapping relationship between the PUSCH repetitions (e.g., PUSCH repetitions #0, #1, #2, #3, #4 and #5) and TPMIs is based on a round robin rule. For example, given that the UE 302 is configured with two TPMIs (e.g., TPMI #0 and TMPI #1) each indicating a (transmit) precoder for a PUSCH transmission to a TRP (e.g., TRP 304 or TRP 306), two RVs (e.g., RV #0 and RV #2), two panel indications (e.g., panel #1 and panel #3) each indicating a (antenna) panel equipped on the UE 302, and six PUSCH repetitions (i.e., the number of repetitions for one PUSCH scheduling is six), according to the round robin rule, TPMI #0, RV #0, and panel #1 may map to PUSCH repetition #0, PUSCH repetition #2 and PUSCH repetition #4, while TPMI #1, RV #2, and panel #3 may be mapped to PUSCH repetition #1, PUSCH repetition #3, and PUSCH repetition #5. In other words, the UE 302 may apply TPMI #0, RV #0 and panel #1 to perform PUSCH repetitions #0, #2 and #4, and apply TPMI #1, RV #2 and panel #3 to perform PUSCH repetition #0, #2 and #4.

In one implementation, multiple PUSCH repetitions may be divided into one or more groups, where each group may map to a particular TPMI, RV, beam, and/or panel indication. The number of groups may be determined based on the number of parameter sets (e.g., TPMI, RV, and/or panel indication) indicated by the NW, as illustrated in FIG. 4.

Figure 4:
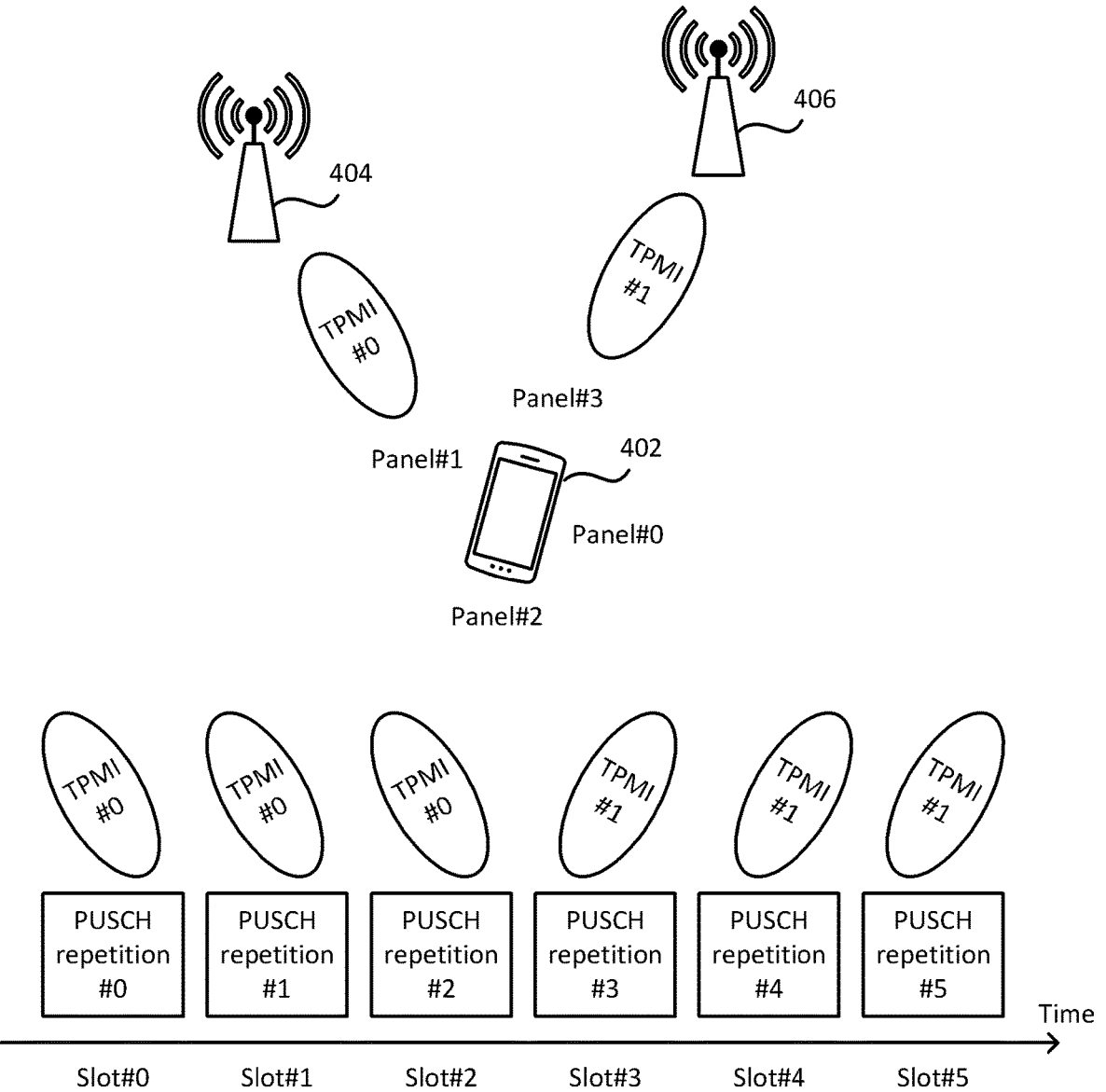
FIG. 4 is a schematic diagram illustrating multiple PUSCH repetitions mapped to different TPMIs according to an implementation of the present disclosure.

FIG. 4 is a schematic diagram illustrating multiple PUSCH repetitions mapped to different TPMIs according to an implementation of the present disclosure. As illustrated in FIG. 4, given that the UE 402 is configured with two TPMIs (e.g., TPMI #0 and TMPI #1) each indicating a (transmit) precoder for a PUSCH transmission to a TRP (e.g., TRP 404 or TRP 406), two RVs (e.g., RV #0 and RV #2), two panel indications (e.g., panel #1 and panel #3) each indicating a (antenna) panel equipped on the UE 402, and six PUSCH repetitions (i.e., PUSCH repetitions #0, #1, #2, #3, #4, and #5), the six PUSCH repetitions may be divided into two groups (e.g., a first group including PUSCH repetitions #0, #1 and #2, and a second group including PUSCH repetitions #3, #4 and #5) each mapping to a particular set of parameters. For example, the first group may map to TPMI #0, RV #0, and panel #1, and the second group may map to TPMI #1, RV #2, and panel #3.

In one implementation, a UL TCI carried by a DCI format or an RRC message may be used to indicate which mapping rule (e.g., the round-robin-based mapping illustrated in FIG. 3 or the group-based mapping illustrated in FIG. 4) to be applied.

UE Capability Reporting

For PUSCH enhancement in multi-TRP operations, there may be only one of the panel(s) on the UE to be activated for transmission at a time. The UE may need to support panel switching in order to handle the instruction from the gNB. For example, the gNB may request the UE to perform PUSCH repetition(s) in a set of (time) slots with UL resources, where the PUSCH repetition transmitted in each time slot may be transmitted via different panels of the UE. The panels of the UE may correspond to different TRPs. The set of slots may include multiple time slots that are continuous in the time domain. As illustrated in FIG. 2, 3 or 4, slots #0 to #5 are arranged one after another in the time domain and therefore considered continuous in the time domain. In another example, the set of slots may include one or more slots that are not continuous in the time domain.

To execute the instruction, the UE may switch the panel from one to another in different slots that are indicated for PUSCH transmission. The panel switching may be fast panel switching described previously since the transmissions in two neighboring slots may be applied with different panels.

The UE may inform the gNB whether it could support multi-TPMIs and SRIs (or panel indications) for PUSCH repetition in multi-TRP operations via explicit signaling or other implicit ways.

In some implementations, if the UE supports performing PUSCH repetitions in a multi-TRP scenario, the UE may inform the gNB whether it is equipped with such UE capability. For example, the UE may inform the gNB that it supports performing PUSCH repetitions in a multi-TRP scenario. In another example, the UE may inform the gNB that it supports performing PUSCH repetitions in a multi-TRP scenario by fast panel/beam switching.

In some implementations, a new Information Element (IE) field(s) may be added to specific signaling to inform the network whether a UE supports fast panel switching in a multi-TRP scenario. If fast panel switching is supported, such signaling may be supported for non-fallback DCI format, such as format 0_1 and/or 0_2.

In some implementations, the new IE field may be added in a parameter (e.g., MIMO-ParametersPerBand) to indicate whether the UE supports performing PUSCH repetitions in a multi-TRP scenario by fast panel switching.

In one implementation, an IE may be provided to indicate whether the UE supports applying multiple transmit precoders (e.g., whether the UE supports decoding/parsing a DCI format(s) having one or multiple TPMI fields each including at least one TPMI value). For example, the IE may be a parameter, pusch-multiTPMI, having an enumerated data type (defined by Abstract Syntax Notation One (ASN.1)) that is used to represent one of a list of enumerated values. An example of the IE is shown as follows:

pusch-multiTPMI ENUMERATED {supported} OPTIONAL, where ENUMERTED represents an enumerated data type and "supported" is an enumerated value. The value of pusch-multiTPMI may be set to "supported" to indicate that the UE supports applying multiple transmit precoders. In one implementation, the pusch-multiTPMI may further indicate support of performing fast panel switching between multiple indicated precoders that are obtained from a TPMI field(s) received from a certain frequency range (e.g., Frequency Range 2 (FR2)).

In one implementation, an IE may be used to indicate whether the UE supports decoding/parsing multiple SRS resource information indications that are included in multiple DCI fields (e.g., SRI field(s)) of a DCI format. It is noted that SRI field is simply an example of signaling. The IE may provide information on selected UL beam for associated PUSCH transmission by providing a reference RS. In one implementation, the IE may be included in a new field "UL-TCI". The field may co-exist or replace SRI field. An example of the IE may be represented as follows:

pusch-multiSRI ENUMERATED {supported} OPTIONAL, where ENUMERTED represents an enumerated data type and "supported" is an enumerated value. The IE pusch-multiSRI may further indicate supporting fast panel switch among indicated beams via e.g., SRI field(s) in certain frequency range, for example, FR2.

In one implementation, an IE may be provided to indicate supporting multiple active UE panels for fast panel switching. Additionally or alternatively, the number of UE panels and/or the number of UE panels which can be simultaneously activated may be reported by the UE. An example of the IE may be represented as follows:

pusch-multiPanelIndication ENUMERTED {supported} OPTIONAL, where ENUMERTED represents an enumerated data type and "supported" is an enumerated value. In one implementation, the IE may further indicate supporting multiple transmit precoders indication based on supported DCI format(s), and/or indicate supporting multiple UL beam information indication based on supported DCI format(s). The IE may be constrained to certain frequency range, for example, FR2.

In one implementation, an IE may be provided to indicate supporting multiple active UE panels for fast panel switching. Additionally or alternatively, the number of UE panels and/or the number of UE panels which can be simultaneously activated may be reported by the UE. For example, the IE may be represented as follows:

pusch-fastPanelSwitching ENUMERTED {supported} OPTIONAL, where ENUMERTED represents an enumerated data type and "supported" is an enumerated value. The IE may further indicate supporting multiple transmit precoders indication based on supported DCI format(s), and/or indicate supporting multiple UL beam information indication based on supported DCI format(s). The IE may be constrained to certain frequency range, for example, FR2.

In one implementation, an IE may be provided to indicate supporting multiple active UE panels for fast panel switching. Additionally or alternatively, the number of UE panels and/or the number of UE panels which can be simultaneously activated may be reported by the UE. For example, the IE may be represented as follows:

pusch-fastBeamSwitching ENUMERTED {supported} OPTIONAL, where ENUMERTED represents an enumerated data type and "supported" is an enumerated value. The IE may further indicate supporting multiple transmit precoders indication based on supported DCI format(s), and/or indicate supporting multiple UL beam information indication based on supported DCI format(s). The IE may be constrained to certain frequency range, for example, FR2.

In some implementations, if the UE supports multi-panel transmission, e.g., the type1 multiPanel codebook is supported by the UE, it may implicitly indicate that the UE support fast panel switching, and the gNB may transmit the DCI carrying multiple TPMIs and SRIs (or panel indications).

In some implementations, if the UE doesn't report the relationship among each antenna port is non-coherence, it may implicitly indicate that the UE support fast panel/beam switching, and the gNB may signal the DCI carrying multiple TPMIs.

In some implementations, if a UE supports the PUSCH repetition (e.g., the UE reports that pusch-RepetitionMulti-Slots is supported) and the multi-panel transmission (e.g., the UE reports that type1 multiPanel codebook is supported), the UE may implicitly inform the gNB that it may support PUSCH repetitions in multi-TRP operations.

In some implementations, the UE may report how many panels/beams it can used to transmit PUSCH. After UE reports the number of its available panels/beams, the UE may obtain more than one SRS-CB resource sets (e.g., the usage of SRS set is set to 'codebook'), and/or the number of SRS-CB resources (e.g., the SRS resources used for CB-based UL transmission) may be greater than two. In addition, if the network configures more than one SRS-CB resource set, the UE may transmit each SRS-CB resource set in the different time (e.g., time slot, subframe, and so on, but not limited to), e.g., the UE may not simultaneously transmit multiple SRS-CB resource sets in multi-TRP transmissions.

In some implementations, if the network indicates that type1 configured grant is used for PUSCH transmission in multi-TRP operations, the UE may acquire the essential information (e.g., multiple TPMIs, multiple SRIs, multiple panel indications, and/or multiple TPC command for PUSCH transmission) used for PUSCH transmission in the dedicated RRC message.

SRS Resources Extension in an SRS Resource Set for CB-Based UL Transmission

For CB-based PUSCH enhancement in multi-TPR, SRS resources extension may be needed to increase panel diversity. As described previously, SRS resources extension may refer to increasing the maximum number of SRS resources configured in an SRS-CB resource set (e.g., an SRS resource set used for CB-based UL transmission) to be greater than two.

Figure 5:
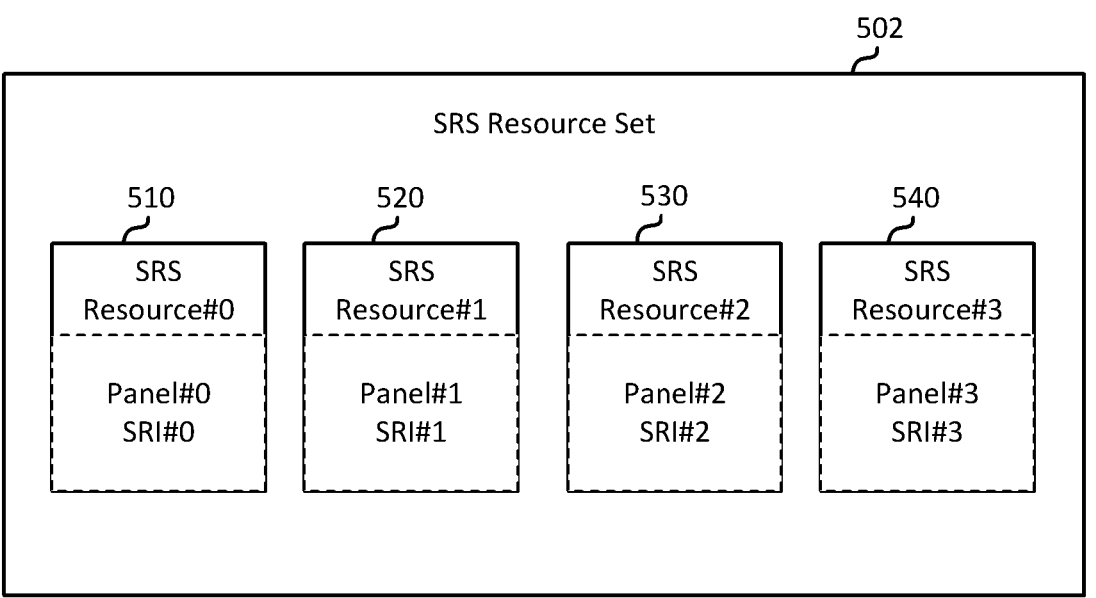
FIG. 5 is a schematic diagram illustrating SRS resource extension that the number of SRS resources in an SRS resource set is up to four, in accordance with an implementation of the present disclosure.

FIG. 5 is a schematic diagram illustrating SRS resource extension that the number of SRS resources in an SRS resource set is up to four, in accordance with an implementation of the present disclosure. As illustrated in FIG. 5, an SRS resource set 502 may be configured with up to four SRS resources (e.g., SRS resource #0 510, SRS resource #1 520, SRS resource #2 530 and SRS resource #3 540). Each SRS resource may be mapped to a specific panel/beam. For example, SRS resource #0 510 may map to panel #0 and SRI #0; SRS resource #1 520 may map to panel #1 and SRI #1; SRS resource #2 530 may map to panel #2 and SRI #2; SRS resource #3 540 may map to panel #3 and SRI #3.

A UE may transmit the SRS resources (e.g., SRS resource #0 510, SRS resource #1 520, SRS resource #2 530 and SRS resource #3 540, if there are four SRS resources configured in the SRS resource set 502) in the SRS resource set 502 in the UL direction. Based on the transmitted SRS resources, the gNB may perform channel estimation to derive proper transmit parameter(s), e.g., precoder(s), for a subsequent PUSCH transmission.

In one implementation, if there are two TRPs, the network may configure two SRS-CB resource sets to a UE to perform CB-based UL transmission in multi-TRP operations. These two SRS-CB resource sets may be transmitted at different time points (e.g., different OFDM symbols, time slots, or subframes) configured by the network. Based on the result of UE capability reporting (e.g., full coherence, partial coherence, or non-coherence) and the SRS resources included in the two SRS-CB resource sets, the gNB may determine two precoders for supporting PUSCH repetition in multi-TRP operations. For example, given that there are eight PUSCH repetitions and that the network configures that TPMI=0, the UE may use the TPMI (=0) to transmit a certain group of PUSCH repetitions (e.g., including PUSCH repetition #0, PUSCH repetition #2, PUSCH repetition #4, and PUSCH repetition #6). If the TPMI is configured with another value (e.g., 6), the UE may use the TPMI to transmit another group of PUSCH repetitions (e.g., including PUSCH repetition #1, PUSCH repetition #3, PUSCH repetition #5, and PUSCH repetition #7).

In some implementations, an SRS-CB resource set (e.g., an SRS resource set whose usage is set to 'codebook') may contain more than two SRS resources (i.e., SRS-CB resources).

In some implementations, the number of SRS-CB resources may be explicitly indicated in an UL TCI. For example, the UE may obtain the information of SRS-CB resources (e.g., the number of SRS-CB resource, and/or the position of SRS resources) contained in the UL TCI carried in the DCI format.

In some implementations, the number of SRS-CB resources may be implicitly indicated. For example, the UE may report how many panels/beams it can use for PUSCH transmission. The number of SRS-CB resources may be associated with the number of panels/TX beams. The UE may then obtain the information of SRS resources in the SRS-CB resource set according to its panel/TX beam. For example, if the UE report that it is able use four panels to transmit PUSCH, the UE may expect that the number of SRS resources in a SRS-CB resource set is equal or less than four.

In some implementations, the gNB may indicate the same panel/TX beam/TPMI to the UE for transmitting individual PUSCH repetitions.

In some implementations, instructing a UE to apply different SRS resources in the SRS resource set may imply that panel switching between associated PUSCH transmissions is required. Panel switching may be subject to switch latency. In other words, there may be time gap at least between PUSCH transmissions with different panels.

In some implementations, the number of SRS resource sets configured for channel sounding for CB-based UL transmission may be more than one.

In one implementation, multiple SRS resource sets may be associated with different panels. In such a case, if multiple SRS resources belonging to different SRS resource sets (which are associated with different panels) are indicated by the SRI fields of a DCI format, it may imply that panel switch between associated PUSCH transmissions is required. In contrast, if one or more SRS resources belonging to the same SRS resource set is/are indicated by the SRI field(s) of a DCI format, it may imply that panel switch between associated PUSCH transmissions is not required.

In some implementations, if the number of SRS resources configured for an SRS resource set (e.g., corresponding to parameter SRS-ResourceSet) with a corresponding parameter "usage" set to "codebook" is more than two, the UE may expect that the DCI format(s) that it monitors for PUSCH transmission may fulfill at least one of the following conditions (1) to (3):

(1) The DCI format includes more than one TPMI for indicating the precoders used to transmit individual PUSCH repetitions.

(2) The DCI format includes more than one SRI for indicating the panels to transmit the PUSCH repetitions. In other words, each PUSCH repetition may be transmitted via a corresponding panel indicated by the SRI.

(3) The DCI format includes more than one panel indication for indicating the panels to transmit the PUSCH repetitions. In other words, each PUSCH repetition may be transmitted via a corresponding panel indicated by the panel indication.

In some implementations, if the number of SRS resources configured for an SRS resource set (e.g., corresponding to parameter SRS-ResourceSet) a corresponding parameter "usage" set to "codebook" is more than two, the UE may expect to obtain multiple TPMIs, SRIs (or panel indications) via at least one of the following signaling:

the TPMI fields and SRI (or panel indication) fields included in a DCI format;

an UL TCI field included in a DCI format; and one or more dedicated RRC messages.

Multiple TPMIs and SRIs (or Panel Indications) Signaling for PUSCH Repetition in Multi-TRP Operations As illustrated in FIG. 2, a UE (e.g., UE 202) may perform PUSCH repetitions (e.g., PUSCH repetitions #0 to #5) in a multi-TRP scenario to enhance transmission reliability. Since different TRPs (e.g., TRPs 204 and 206) may be located on different geographical areas, each TRP may correspond to a TPMI and an SRI (or panel indication) for an associated PUSCH repetition. In such a case, performing PUSCH repetitions in a multi-TRP scenario may support multiple TPMIs/SRIs/panel indications.

In some implementations, the network may inform the UE how many TPMIs, SRIs (or panel indications) it needs to obtain for PUSCH transmission in multi-TRP operations via dedicated RRC signaling.

In some implementations, new fields may be added to DCI formats to carry extra TPMIs and SRIs (or panel indications). For example, the DCI formats may carry two TPMI fields and two SRI fields (or panel indication field). A pair of the TPMI field and the SRI field (or panel indication field) may indicate which TPMI and panel are used to transmit PUSCH(s) to one TRP, and another pair of the TPMI filed and the SRI field (or panel indication field) may indicate which TPMI and panel are used to transmit PUSCH to another TRP. From UE's perspective, the target TRP for individual TPMI/SRI pairs may not be known. In another example, the target TRP may be known to UE by associating individual TMPI/SRI pairs with different TRPs via a specific index, e.g., CORESETPoolIndex.

In one implementation, the bit length for each TPMI and the bit length for each SRI may be defined in 3GPP Technical Specifications (TSs) of Rel-16.

In some implementations, the DCI formats may carry UL TCI field providing essential information (e.g., SRIs, panel indications, the number of PUSCH repetitions, the start position of the OFDM symbol for each PUSCH repetition in different slots) for UL transmission. The multiple SRIs (or panel indications) may be included in the TCI of a DCI formats. For example, a TCI in a DCI format may include two SRIs/panel indications. The first SRI (or panel indication) may indicate a beam/panel to be used to transmit the PUSCH repetition(s) to a TRP, and the second SRI (or panel indication) may indicate a beam/panel to be used to transmit the PUSCH repetition(s) to another TRP.

In some implementations, in the DCI formats, the bit length of TPMI and SRI (or panel indication) field may be extended, for carrying multiple TPMIs and SRIs (or panel indications). For example, if the gNB indicates two TPMIs and two SRIs (or panel indication) to the UE, the number of bits in TPMI and SRI (or panel indication) field may be two times the number of bits in Rel-15/Rel-16 TPMI and SRI (or panel indication) field. The first part of bits may represent the TPMI information and SRI (or panel indication) information used to transmit the PUSCH(s) to one TRP, and the remaining part of bits may represent the TPMI information and SRI (or panel indication) information used to transmit the PUSCH(s) to another TRP. In one implementation, both the first part and the second part contain the same number of bits.

In some implementations, the UE may obtain the number of PUSCH repetition via RRC signaling. For slot-based PUSCH repetition, the UE may obtain the resource allocation of the PUSCH transmission (i.e., the start symbol and the number of consecutive symbols for PUSCH transmission in a slot) by DCI format. And then all time slots used for PUSCH repetition may follow the same resource allocation.

The UE may obtain multiple TPMIs, SRIs (or panel indications) in a DCI format. The mapping among RV, TPMI, SRI (or panel indication) and PUSCH repetition may be round robin as illustrated in FIG. 3. In some implementations, if the slot used for PUSCH transmission is conflicted with the DL slot scheduled by the network, the PUSCH transmission in that slot may be canceled, and the mapping among RV, TPMI, SRI (or panel indication) and PUSCH repetition may not be changed, as illustrated in FIG. 6.

Figure 6:
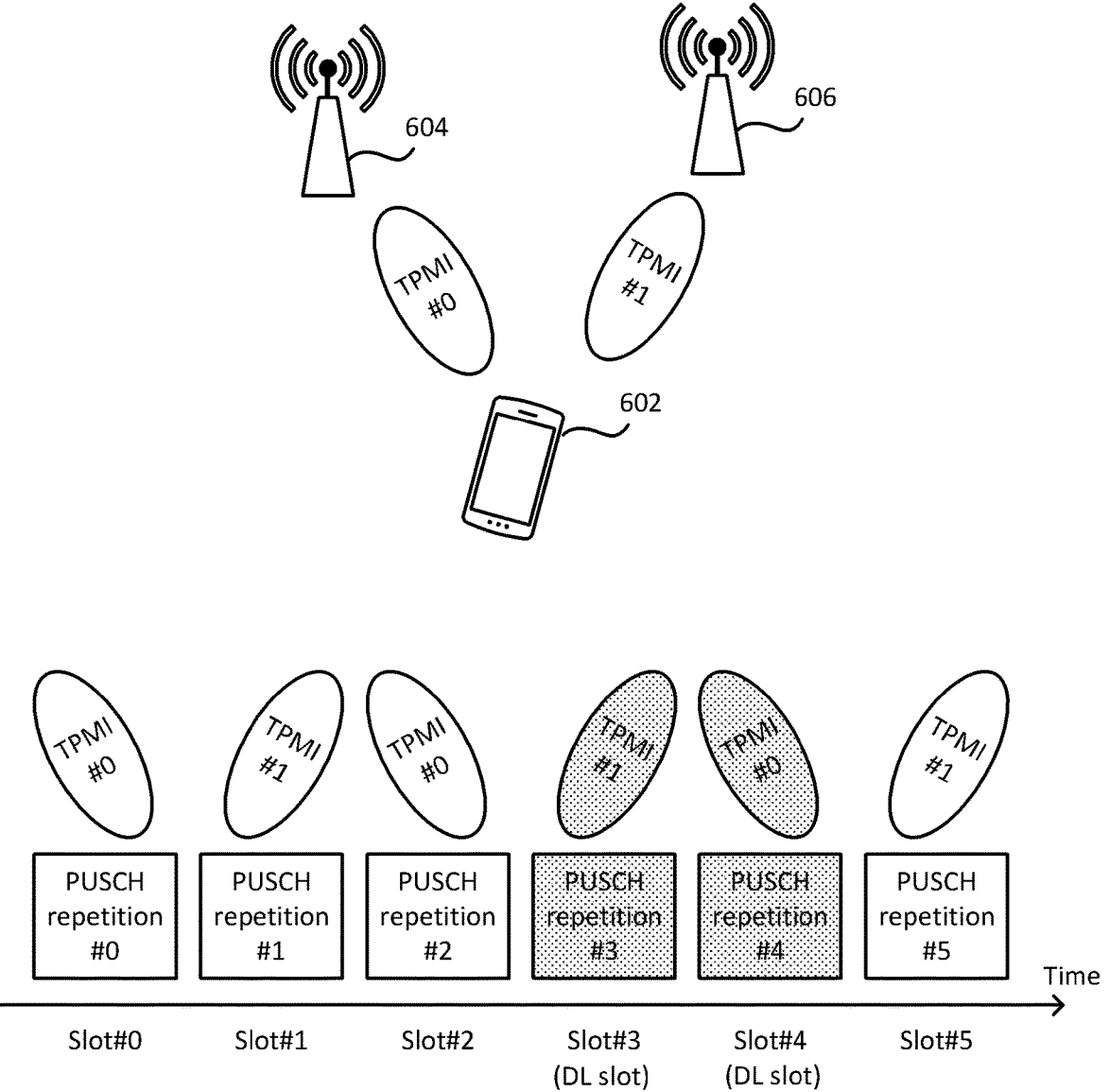
FIG. 6 is a schematic diagram illustrating that multiple PUSCH repetitions are canceled due to conflict with DL slots, in accordance with an implementation of the present disclosure.

FIG. 6 is a schematic diagram illustrating that multiple PUSCH repetitions are canceled due to conflict with DL slots, in accordance with an implementation of the present disclosure. As illustrated in FIG. 6, according to the round robin rule described previously, the UE 602 may need to apply TPMI #0 to transmit PUSCH repetitions #0, #2 and #4 to TRP 604 and apply TPMI #1 to transmit PUSCH repetitions #1, #3 and #5 to TRP 606, but since PUSCH repetition #3 and PUSCH repetition #4 are allocated in slots #3 and #4 which are DL slots, the UE 602 may cancel PUSCH repetition #3 and PUSCH repetition #4 which are allocated in the DL slots.

In some implementations, the number of repetitions may be indicated by a Time Domain. Resource Assignment (TDRA) field in a UL DCI format. The TDRA table may be extended for such signaling. The extended TDRA table may also include entries indicating no repetition for a scheduled PUSCH (i.e., only one PUSCH transmission associated with a scheduling UL DCI).

In some implementations, a new TPMI, SRI (or panel indications) table may be used for PUSCH transmission in multi-TRP operations. An example of the table is shown in Table 1.

TABLE 1

| Bit field mapped to index | CodebookSubset = fully AndPatrial AndNonCohent | Bit field mapped to index | CodebookSubset = nonCoherent |
|---|---|---|---|
| 0 | 1 layer: TPMI#0 = 0: 1 layer: TPMI#1 = 0: | 0 | 1 layer: TPMI#0 = 0: 1 layer: TPMI#1 = 0: |
| 1 | 1 layer: TPMI#0 = 0: 1 layer: TPMI#1 = 1: | 1 | 1 layer: TPMI#0 = 0: 1 layer: TPMI#1 = 1: |
| 2 | 1 layer: TPMI#0 = 0: 1 layer: TPMI#1 = 2: | 2 | 1 layer: TPMI#0 = 1: 1 layer: TPMI#1 = 0: |
| 3 | 1 layer: TPMI#0 = 0: 1 layer: TPMI#1 = 3: | 3 | 1 layer: TPMI#0 = 1: 1 layer: TPMI#1 = 1: |
| 4 | 1 layer: TPMI#0 = 0: 1 layer: TPMI#1 = 4: | | |
| 5 | 1 layer: TPMI#0 = 0: 1 layer: TPMI#1 = 5: | | |
| 6 | 1 layer: TPMI#0 = 1: 1 layer: TPMI#1 = 0: | | |
| 35 | 1 layer: TPMI#0 = 5: 1 layer: TPMI#1 = 5: | | |

According to Table 1, two TPMIs may be provided in each entry for a PUSCH transmission. For example, if the UE reports that a relationship between the antennas (or antenna ports) is full/partial coherence (CodebookSubset=fullyAndPatrialAndNonCohent), the gNB may indicate to the UE an index #3. After that, the UE may start performing PUSCH transmission (e.g., transmitting PUSHC repetition(s)) by applying TPMI=0 and TPMI=3. In Table 1, the term "layer" represents that the transmission channel(s) between a UE and a BS (e.g., a gNB). Also, a layer can be viewed as the rank(s) of a MIMO channel matrix between a UE and a BS (e.g., a gNB).

In one implementation, the table described previously may be associated with following factors (1) and (2):

(1) the number of panels/beams used for PUSCH transmission; and (2) the relationship between the UE's antenna port (e.g., non-coherence, partial coherence, or full coherence), where "full coherence" may mean that all antenna ports can be transmitted coherently, "partial coherence" may mean that only part of antenna port pairs can be transmitted coherently, and "non-coherence" may mean that no antenna port pairs can be transmitted coherently.

In one implementation, the table may indicate to the UE to use the same/different TPMIs and SRIs (or panel indications) for PUSCH transmission.

In some implementations, the network may inform the UE whether the TPMI and SRI (or panel indication) used for PUSCH repetition in multi-TPR are the same or not via higher layer singling.

In some implementations, if the network informs the UE that the TPMI and SRI (or panel indication) used for PUSCH repetition in multi-TRP operations are the same via higher layer signaling, the TPMI and SRI (or panel indication) carried in a single DCI message may be applied for each PUSCH repetition transmitted to different TRPs.

In some implementations, the network may directly inform the UE, via higher layer signaling, that the TPMI and SRI (or panel indication) used for PUSCH repetition in multi-TRP operations are different.

In some implementations, the UE may monitor two DCI messages in the different time slots for PUSCH transmission in multi-TRP operations. The UE may obtain multiple indications (e.g., TPMIs, SRIs (or panel indications), TPCs, and/or resource allocation parameters) used for individual PUSCH repetition.

In some implementations, the network may indicate how many DCI messages the UE needs to decode for obtaining the TPMI(s) and SRI(s) (or panel indication(s)) for PUSCH repetitions.

In some implementations, the network may indicate multiple search spaces for the UE to monitor multiple DCI messages. For example, if there are four DCI messages carrying information for UL transmission (e.g., TPMI, SRI, and/or panel indication), the network may configure four search spaces to the UE for PDCCH monitoring. The UE may monitor the DCI format scrambled with Cell-Radio Network Temporary Identifier (C-RNTI) in each configured search spaces for UL transmission.

In some implementations, the network may indicate multiple RNTIs for a UE to monitor multiple DCI messages in a search space, e.g., a dedicated search space used for multi-TRP transmission. For example, if there are four DCI messages carrying the information for UL transmission (e.g., TPMI, SRI, and/or panel indication), the network may configure four RNTIs and one search space to the UE for PDCCH monitoring. Then the UE may monitor DCI format scrambled with different Radio Network Temporary Identifiers (RNTIs) in a configured search spaces for UL transmission.

In one implementation, an RNTI used for multiple DCI monitoring may be related to at least one of (1) the number of TRPs used for UL transmission, and (2) the number of PUSCH repetitions.

In one implementation, there is one dedicated RNTI in the dedicated search space used for multi-TRP operations. For a given slot, multiple DCI messages may be received for indicating PUSCH repetition of a UL scheduling.

In one implementation, DCI messages may correspond to PUSCH repetitions based on a one-to-one correspondence relationship. For example, given that there are two DCI messages (e.g., DCI message #1 and DCI message #2) and two PUSCH repetitions (e.g., PUSCH repetition #1 and PUSCH repetition #2), DCI message #1 may include the transmit parameter(s) for PUSCH repetition #1 and DCI message #2 may include the transmit parameter(s) for PUSCH repetition #2.

In one implementation, a singe DCI message may correspond to multiple PUSCH repetitions based on certain (pre-)configured rules. For example, a first received DCI message may provide the transmit parameter(s) for a first group of PUSCH repetitions (e.g., PUSCH repetitions #0, #2 and #4), and a second received DCI message may include the transmit parameter(s) for a second group of PUSCH repetitions (e.g., PUSCH repetitions #1, #3, and #5). From UE's perspective, the information used to determine the transmission timing of PUSCH repetitions may be included in a specific DCI message or (pre-)configured/(pre-)defined.

In some implementations, if the network indicates to the UE that the UE only needs to decode one DCI message, the TPMI and SRI (or panel indication) carried by the DCI message may be applied to each PUSCH repetition for multi-TRP operations. In this situation, each PUSCH repetition transmitted to a corresponding TRP may apply the same TPMI and SRI (or panel indication).

In some implementations, if the network indicates to the UE that the UE needs to decode multiple DCI messages, the TPMI and SRI (or panel indication) carried by each of the DCI messages may be applied to transmit at least one corresponding PUSCH repetition to a corresponding TRP. For example, the network may indicate to the UE to decode two DCI messages to obtain TPMIs and SRIs (or panel indications), and indicate that the number of PUSCH repetitions is seven and the number of TRPs is two. In this situation, the TPMI and SRI (or panel indication) included in (or carried by) one of the two DCI messages may be applied to transmit a predetermined group of PUSCH repetitions (e.g., PUSCH repetitions #0, #2, #4 and #6) to one of the two TRPs, while the TPMI and SRI (or panel indication) included in (or carried by) another of the two DCI messages may be applied to transmit another group of predetermined PUSCH repetitions (e.g., PUSCH repetitions #1, #3 and #5) to another of the two TRPs.

In some implementations, if a DCI format can carry only one TPMI and/or only one SRI (or panel indication) for PUSCH transmission for multi-TRP operations, additional TPMI(s), SRI(s) (or panel indication(s)) may be obtained by the UE from the DCI format via one of the following approaches (1) and (2):

(1) Deriving the additional TPMI(s) and/or SRI(s) (or panel indication(s)) via at least one delta value provided by the network. For example, the network may configure a set of delta values (e.g., $\delta_{TPMI}$, $\delta_{SRI\ (or\ panel\ indication)}$) to a UE via RRC signaling or a DCI format. If the UE has obtained a TPMI "X" and an SRI (or panel indication) "Y" which are included in a DCI format, the UE may further derive another set of TPMI and SRI (or panel indication), which are not included in the DCI format, according to the set of delta values from the network. For example, the other TPMI may be derived by adding the corresponding TPMI delta value, $\delta_{TPMI}$, to the value X (e.g., $X+\delta_{TPMI}$); the other SRI (or panel indication) may be derived by adding the corresponding SRI/panel indication delta value, $\delta_{SRI\ (or\ panel\ indication)}$, to the value Y.

(2) Deriving the additional TPMI(s) and/or SRI(s) (or panel indication(s)) according to at least one predefined formula. If the UE has obtained a TPMI "X" and an SRI (or panel indication) "Y" which are included in a DCI format, the UE may further derive another TPMI, X', and another SRI (or panel indication), Y', which are not included in the DCI format, according to the following formulas:

$$X'=X+2, \; Y'=Y+2; \text{ or}$$

$$X'=\lfloor (X+1)/2 \rfloor$$

Redundancy Version (RV), Beams, Panels Scheduling for Each PUSCH Repetition

Each PUSCH repetition triggered by the same UL DCI may be associated with different beams, panels, or RVs. In one implementation, round robin scheduling may be used as the mapping rule. For example, there may be two TPMIs (e.g., TPMI #0 and TMPI #1) which represents two transmit precoders applied for PUSCH transmission, two RVs (e.g., RV #0 and RV #2), two panel indications (e.g., panel #1 and panel #3 which represents two physical panels that UE is equipped with), and seven PUSCH repetitions (i.e., the number of (PUSCH) repetitions for one PUSCH scheduling is seven). According to round robin rule, TPMI #0, RV #0, and panel #1 may be mapped to PUSCH repetition #0, PUSCH repetition #2, PUSCH repetition #4, and PUSCH repetition #6; TPMI #1, RV #2, and panel #3 may be mapped to PUSCH repetition #1, PUSCH repetition #3, and PUSCH repetition #5. The PUSCH repetitions may be divided into several groups with each mapping to a certain RV/beam/ panel. The number of PUSCH repetitions in a group may depend on the number of TPMIs/RVs/panels. For example, the seven PUSCH repetitions may be divided into two groups for TPMI-to-PUSCH repetition mapping, RV-to-PUSCH repetition mapping, and panel-to-PUSCH repetition mapping, where TPMI #0, RV #0, and panel #1 may map to PUSCH repetition #0, PUSCH repetition #1, PUSCH repetition #2, and PUSCH repetition #3; TPMI #1, RV #2, and panel #3 may map to PUSCH repetition #4, PUSCH repetition #5, and PUSCH repetition #6. In one implementation, a UL TCI included in a DCI format or an RRC message may indicate which mapping rule used for PUSCH transmission, e.g., round robin.

Figure 7:
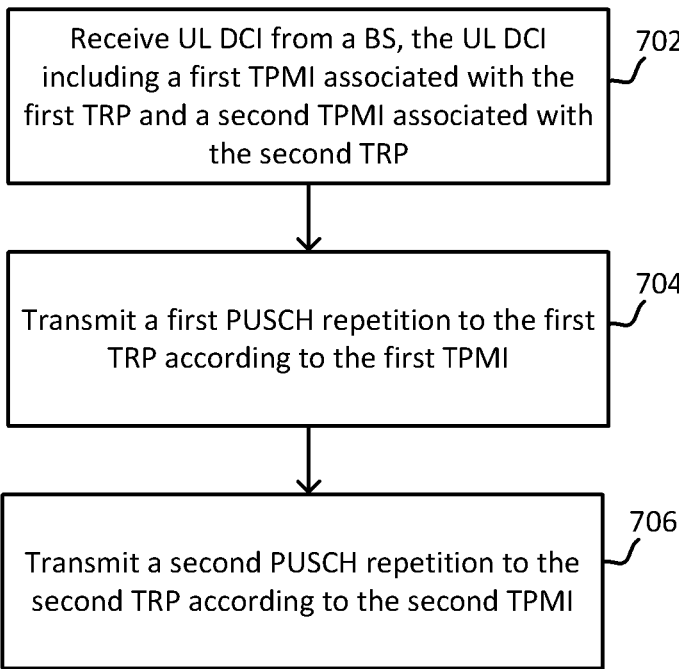
FIG. 7 illustrates a flowchart for a method performed by a UE for communicating a plurality of TRPs including a first TRP and a second TRP, according to an implementation of the present disclosure.

FIG. 7 illustrates a flowchart for a method 700 performed by a UE for communicating a plurality of TRPs, according to an implementation of the present disclosure. Although actions 702, 704 and 706 are illustrated as separate actions represented as independent blocks in FIG. 7, these separately illustrated actions should not be construed as necessarily order dependent. The order in which the actions are performed in FIG. 7 is not intended to be construed as a limitation, and any number of the disclosed blocks may be combined in any order to implement the method, or an alternate method. For example, the order of performing actions 704 and 706 may be reversed. Moreover, each of actions 702, 704 and 706 may be performed independent of other actions, and can be omitted in some implementations of the present disclosure.

In action 702, the UE may receive UL DCI from a BS. The UL DCI includes a first TPMI associated with a first TRP and a second TPMI associated with a second TRP. The first TRP and the second TRP may be located in different geographical areas and coupled to the same BS to extend the radio coverage of the BS. In action 704, the UE may transmit a first PUSCH repetition to the first TRP according to the first TPMI. In action 706, the UE may transmit a second PUSCH repetition to the second TRP according to the second TPMI.

It is noted that compared to the "multiple UL DCI messages" described previously, the UL DCI described in the method 700 may refer to "a UL DCI message" or "a DCI message." Moreover, each PUSCH repetition may refer to a repeated PUSCH transmission performed in a PUSCH repetition process in which a PUSCH transmission is repeatedly by the UE in a set of predetermined time positions.

In some implementations, the first TPMI and the second TPMI may apply the same number of layers for transmission.

In some implementations, the UE may further receive, from the BS, an RRC message configuring a first SRS resource set and a second SRS resource set, where the first SRS resource set may be associated with the first TRP, and the second SRS resource set associated with the second TRP. The UE may transmit the first SRS resource set and the second SRS resource set to the first TRP and the second TRP based on the RRC message.

In some implementations, the UL DCI may further include a first SRI corresponding to the first SRS resource set and a second SRI corresponding to the second SRS resource set. Each of the first SRS resource set and the second SRS resource set may include at most two SRS resources.

As described previously, the UL DCI may include multiple sets of transmit parameters each associated with one of the multiple TRPs communicating with the UE, where each set of transmit parameters may include a TPMI and/or an SRI (or panel indication). According to the method 700, the correspondence relationship between the multiple sets of transmit parameters and the TRPs is notified to the UE via the UL DCI message, so that the UE knows which set of transmit parameters should be used/applied to transmit a corresponding PUSCH repetition to a specific TRP. With the method 700, signaling overhead for multi-TRP operations is reduced since the UL DCI from the BS is modified to carry multiple sets of transmit parameters for communicating with multiple TRPs. Therefore, the method 700 and other various implementations described in the present disclosure, are more flexible and better fit the requirements of multi-TRP operations than a legacy communication system.

In some implementations, the UE may further transmit a capability message to the BS. The capability message may indicate whether the UE supports multi-TRP based transmissions, and/or whether the UE supports fast panel switching for multi-TRP based transmissions. If a UE supports multi-TRP based transmission, it may mean that the UE is able to carry out a scheduled transmission(s) by communicating with multiple TRPs.

The following may be used to further disclose terms, examples, implementations, implementations, actions, and/ or behaviors:

Antenna Panel: a conceptual term for UE antenna implementation. It may be assumed that a panel is an operational unit for controlling a transmit spatial filter (beam). A panel is typically consisted of a plurality of antenna elements. In one implementation, a beam can be formed by a panel and in order to form two beams simultaneously, two panels are needed. Such simultaneous beamforming from multiple panels is subject to UE capability. A similar definition for "panel" may be possible by applying spatial receiving filtering characteristics.

Beam: the term "beam" here may be replaced by spatial filter. For example, when UE reports a preferred gNB TX beam, UE is essentially selecting a spatial filter used by gNB. The term "beam information" is used to provide information about which beam/spatial filter is being used/ selected. In one implementation, individual reference signals are transmitted by applying individual beams (spatial filters). Thus, the term beam or beam information may be represented by reference signal resource index(es).

DCI: DCI stands for downlink control information and there are various DCI formats used in LTE in PDCCH. The DCI format is nothing but a predefined format in which the downlink control information is packed/formed and transmitted in PDCCH.

TCI state: a TCI state contains parameters for configuring a QCL relationship between one or two DL reference signals and a target reference signal set. For example, a target reference signal set may be the DM-RS ports of PDSCH or PDCCH.

HARQ: A functionality ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ process.

Figure 8:
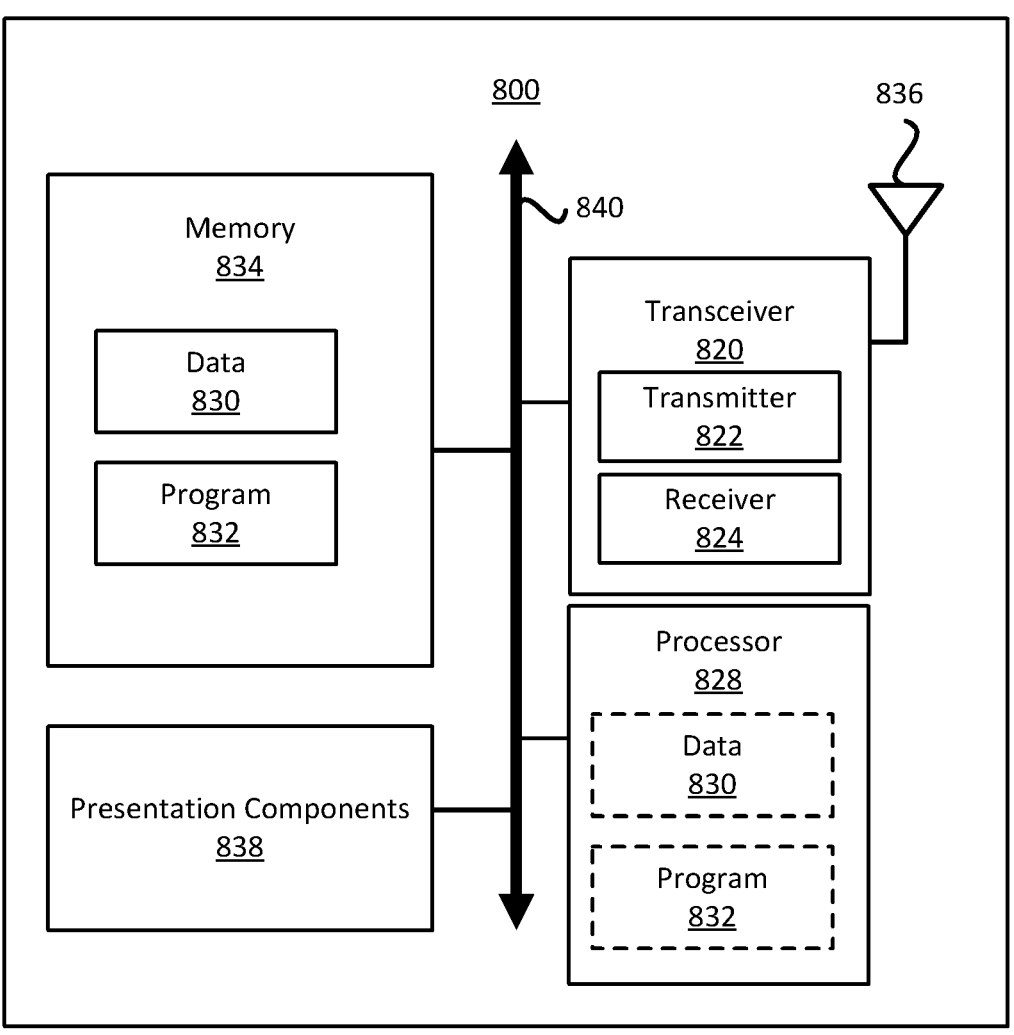
FIG. 8 is a block diagram illustrating a node for wireless communication according to an implementation of the present disclosure.

FIG. 8 is a block diagram illustrating a node 800 for wireless communication according to an implementation of the present disclosure. As illustrated in FIG. 8, a node 800 may include a transceiver 820, a processor 828, a memory 834, one or more presentation components 838, and at least one antenna 836. The node 800 may also include a radio frequency (RF) spectrum band module, a BS communications module, a network communications module, and a system communications management module, Input/Output (I/O) ports, I/O components, and a power supply (not illustrated in FIG. 8).

Each of the components may directly or indirectly communicate with each other over one or more buses 840. The node 800 may be a UE or a BS that performs various functions disclosed with reference to FIGS. 1 through 7.

The transceiver 820 has a transmitter 822 (e.g., transmitting/transmission circuitry) and a receiver 824 (e.g., receiving/reception circuitry) and may be configured to transmit and/or receive time and/or frequency resource partitioning information. The transceiver 820 may be configured to transmit in different types of subframes and slots including but not limited to usable, non-usable and flexibly usable subframes and slot formats. The transceiver 820 may be configured to receive data and control channels.

The node 800 may include a variety of computer-readable media. Computer-readable media may be any available media that may be accessed by the node 800 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

What is claimed is:

1. A method performed by a User Equipment (UE) for communicating with a plurality of Transmission Reception Points (TRPs), including a first TRP and a second TRP, associated with a Base Station (BS), the method comprising:

receiving, from the BS, one or more Radio Resource Control (RRC) messages that configure the UE with a first Sounding Reference Signal (SRS) resource set associated with the first TRP, a second SRS resource set associated with the second TRP, different from the first TRP, and a cyclical mapping pattern for a plurality of Physical Uplink Shared Channel (PUSCH) repetitions, the first SRS resource set and the second SRS resource set being configured for codebook-based transmissions; and transmitting the plurality of PUSCH repetitions based on the cyclical mapping pattern at least by:

transmitting a first PUSCH repetition of the plurality of PUSCH repetitions to the first TRP based on the first SRS resource set and the cyclical mapping pattern; and transmitting a second PUSCH repetition of the plurality of PUSCH repetitions to the second TRP based on the second SRS resource set and the cyclical mapping pattern after transmitting the first PUSCH repetition.

2. The method of claim 1, wherein the one or more RRC messages comprise a first Transmit Precoder Matrix Indication (TPMI) associated with the first SRS resource set and a second TPMI associated with the second SRS resource set.

3. The method of claim 2, wherein the cyclical mapping pattern determines a mapping relationship among the first TPMI, the second TPMI, and the plurality of PUSCH repetitions.

4. The method of claim 2, wherein the one or more RRC messages further comprise a first SRS resource set indicator corresponding to the first SRS resource set and a second SRS resource set indicator corresponding to the second SRS resource set.

5. The method of claim 1, further comprising:

receiving Uplink (UL) Downlink Control Information (DCI) from the BS, the UL DCI comprising a first Transmit Precoder Matrix Indication (TPMI) associated with the first SRS source set and a second TPMI associated with the second SRS resource set.

6. The method of claim 5, wherein the cyclical mapping pattern determines a mapping relationship among the first TPMI, the second TPMI, and the plurality of PUSCH repetitions.

7. The method of claim 5, wherein the second TPMI applies a same number of layers indicated by the first TPMI for the codebook-based transmissions.

8. The method of claim 5, wherein the UL DCI further comprises a first SRS resource set indicator corresponding to the first SRS resource set and a second SRS resource set indicator corresponding to the second SRS resource set.

9. A User Equipment (UE) for communicating with a plurality of Transmission Reception Points (TRPs), including a first TRP and a second TRP, associated with a Base Station (BS), the UE comprising:

transceiver circuitry; and at least one processor, coupled to the transceiver circuitry, and configured to control the transceiver circuitry to:

receive, from the BS, one or more Radio Resource Control (RRC) messages that configure the UE with a first Sounding Reference Signal (SRS) resource set associated with the first TRP, a second SRS resource set associated with the second TRP, different from the first TRP, and a cyclical mapping pattern for a plurality of Physical Uplink Shared Channel (PUSCH) repetitions, the first SRS resource set and the second SRS resource set being configured for codebook-based transmissions; and transmit the plurality of PUSCH repetitions based on the cyclical mapping pattern at least by:

transmitting a first PUSCH repetition of the plurality of PUSCH repetitions to the first TRP based on the first SRS resource set and the cyclical mapping pattern; and transmitting a second PUSCH repetition of the plurality of PUSCH repetitions to the second TRP based on the second SRS resource set and the cyclical mapping pattern after transmitting the first PUSCH repetition.

10. The UE of claim 9, wherein the one or more RRC messages comprise a first Transmit Precoder Matrix Indication (TPMI) associated with the first SRS resource set and a second TPMI associated with the second SRS resource set.

11. The UE of claim 10, wherein the cyclical mapping pattern determines a mapping relationship among the first TPMI, the second TPMI, and the plurality of PUSCH repetitions.

12. The UE of claim 10, wherein the one or more RRC messages further comprise a first SRS resource set indicator corresponding to the first SRS resource set and a second SRS resource set indicator corresponding to the second SRS resource set.

13. The UE of claim 9, wherein the at least one processor is further configured to control the transceiver circuitry to:

receive Uplink (UL) Downlink Control Information (DCI) from the BS, the UL DCI comprising a first Transmit Precoder Matrix Indication (TPMI) associated with the first SRS source set and a second TPMI associated with the second SRS resource set.

14. The UE of claim 13, wherein the cyclical mapping pattern determines a mapping relationship among the first TPMI, the second TPMI, and the plurality of PUSCH repetitions.

15. The UE of claim 13, wherein the second TPMI applies a same number of layers indicated by the first TPMI for the codebook-based transmissions.

16. The UE of claim 13, wherein the UL DCI further comprises a first SRS resource set indicator corresponding to the first SRS resource set and a second SRS resource set indicator corresponding to the second SRS resource set.

* * * * *